(12) United States Patent
Rankin

(10) Patent No.: US 7,775,090 B1
(45) Date of Patent: Aug. 17, 2010

(54) INDUCTIVELY COUPLEABLE PULSE GENERATOR PLATE DETECTOR AND METHOD OF PULSE GENERATOR PLATE DETECTION

(75) Inventor: Brent Rankin, Lima, OH (US)

(73) Assignee: Honda Motor Co., Ltd., Tokyo (JP)

( * ) Notice: Subject to any disclaimer, the term of this patent is extended or adjusted under 35 U.S.C. 154(b) by 205 days.

(21) Appl. No.: 12/057,286

(22) Filed: Mar. 27, 2008

(51) Int. Cl.
*G01M 15/02* (2006.01)
(52) U.S. Cl. .................................................. 73/114.26
(58) Field of Classification Search .............. 73/114.02, 73/114.03, 114.04, 114.05, 114.24, 114.25, 73/114.26, 114.27, 114.28
See application file for complete search history.

(56) References Cited

U.S. PATENT DOCUMENTS

| | | | |
|---|---|---|---|
| 3,697,865 A | 10/1972 | Smith et al. | |
| 3,883,735 A | 5/1975 | Murphy et al. | |
| 4,136,558 A | 1/1979 | Lukes et al. | |
| 4,305,072 A | 12/1981 | Makita | |
| 4,378,004 A | 3/1983 | Petrie | |
| 4,385,605 A | 5/1983 | Petrie et al. | |
| 4,628,269 A | 12/1986 | Hunninghaus et al. | |
| 4,742,332 A | 5/1988 | Schroeder et al. | |
| 4,797,827 A | 1/1989 | Cockerham | |
| 4,870,587 A | 9/1989 | Kumagai | |
| 5,165,271 A | 11/1992 | Stepper et al. | |
| 5,767,394 A | 6/1998 | Butts et al. | |
| 6,490,914 B1 * | 12/2002 | Brandenburg et al. | 73/114.26 |
| 6,640,451 B1 | 11/2003 | Vinarcik | |
| 7,254,991 B2 * | 8/2007 | Stork et al. | 73/114.26 |
| 2008/0148833 A1 * | 6/2008 | Kremer et al. | 73/116.01 |
| 2009/0007865 A1 * | 1/2009 | Nguyen et al. | 123/90.15 |
| 2009/0139478 A1 * | 6/2009 | Dell et al. | 123/90.31 |

* cited by examiner

*Primary Examiner*—Eric S McCall
(74) *Attorney, Agent, or Firm*—Standley Law Group LLP

(57) ABSTRACT

A detector and its method of use for detecting a pulse generator plate, such as a pulse generator plate associated with the crankshaft of an engine or motor. The detector includes a detection sensor that is adapted to inductively couple itself to a pulse generator plate sensor located on an engine or motor of interest when placed in proximity thereto. The detection sensor is preferably connected to an amplifier unit. When a pulse generator plate is present, rotation of the associated crankshaft will cause interruptions of the magnetic fields of both sensors, which interruptions produce electric currents. These electric currents may be passed to the amplifier unit to power an indicator that may be observed by a user. A detector and method of the present invention may be used to detect the presence of and/or damage to a pulse generator plate.

20 Claims, 5 Drawing Sheets

INDUCTIVELY COUPLEABLE PULSE GENERATOR PLATE DETECTOR AND METHOD OF PULSE GENERATOR PLATE DETECTION

BACKGROUND OF THE INVENTIVE FIELD

The present invention is directed to a device for detecting the presence of a pulse generator plate associated with a vehicle crankshaft. More particularly, the present invention is directed to a device for detecting whether such a pulse generator plate is missing or defective.

A pulse generator plate may be coupled to a vehicle crankshaft for the purpose of timing the vehicle's engine. The design of such a pulse generator plate may vary. One known embodiment generally comprises a circular plate having a number of circumferentially spaced projections extending therefrom. A pulse generator plate is typically hidden behind a timing chain/belt cover and, therefore, is not readily visible or accessible on an assembled engine.

A sensor is normally also mounted near the pulse generator plate, and is also typically enclosed within the timing chain/belt cover. The sensor produces a magnetic field that extends to at least a portion of the pulse generator plate. The magnetic field is interrupted during engine operation each time one of the extending projections of the pulse generator plate passes therethrough. The interruptions produced by the extending projections induce a current in the sensor, which can be transmitted from the sensor via wire leads that extend through the timing chain/belt cover. As would be understood by one of skill in the art, the currents induced in the sensor can be used in the timing of a vehicle engine.

It occasionally happens that a pulse generator plate is inadvertently not installed to an engine. It also occasionally happens that one or more of the circumferentially spaced projections extending from the pulse generator plate may be broken or missing. Such conditions may be the source of, or contribute to, engine timing problems.

Unfortunately, once an engine has been assembled, it is difficult to ascertain whether one of these conditions exist without first removing the timing chain/belt cover. This can be a time-consuming process that also may first require the removal of various other engine parts. Consequently, it is desired to be able to determine whether a pulse generator plate is missing or damaged without necessitating removal of the timing chain/cover. A device and method of the present invention enables such a determination to be made.

SUMMARY OF THE GENERAL INVENTIVE CONCEPT

The present invention is directed to a device and method for detecting the absence of a pulse generator plate portion of a vehicle timing system. The present invention is also directed to a device and method for detecting when a pulse generator plate portion of a vehicle timing system has broken or missing elements.

The present invention makes use of inductive coupling in order to perform the aforementioned detection functions. Particularly, a device of the present invention generally includes a detection sensor that can be magnetically (inductively) coupled to the sensor portion of a typical pulse plate detector timing system, even through a timing chain/belt cover. In this manner, the detection function of a device of the present invention may be effected from outside the timing chain/belt cover that typically encloses the pulse generator plate and associated sensor of a motor vehicle.

Due to the inductively-coupled state of a detection sensor of the present invention and the sensor associated with the pulse generator plate of interest, any interruption in the magnetic field of the latter sensor will also affect the magnetic field of the detection sensor (in the manner described above). Thus, interruptions of the magnetic field of the detection sensor while the crankshaft of the associated engine is being rotated are indicative of the presence of a pulse generator plate. Furthermore, assuming that the crankshaft is being rotated at a constant speed, variations in the time between successive interruptions of the detection sensor's magnetic field is indicative of missing or damaged extending projections (or other field interrupting elements) of the pulse generator plate.

The detection sensor of a device of the present invention is connected to an amplifier unit. The amplifier unit is operative to amplify the current flowing from the detection sensor to a level sufficient to, for example, energize a visual indicator (e.g., LED), operate a relay, or otherwise indicate to an operator whether a pulse generator plate is present and/or undamaged.

BRIEF DESCRIPTION OF THE DRAWINGS

In addition to the features mentioned above, other aspects of the present invention will be readily apparent from the following descriptions of the drawings and exemplary embodiments, wherein like reference numerals across the several views refer to identical or equivalent features, and wherein.

DETAILED DESCRIPTION OF EXEMPLARY EMBODIMENT(S)

Figure 1:
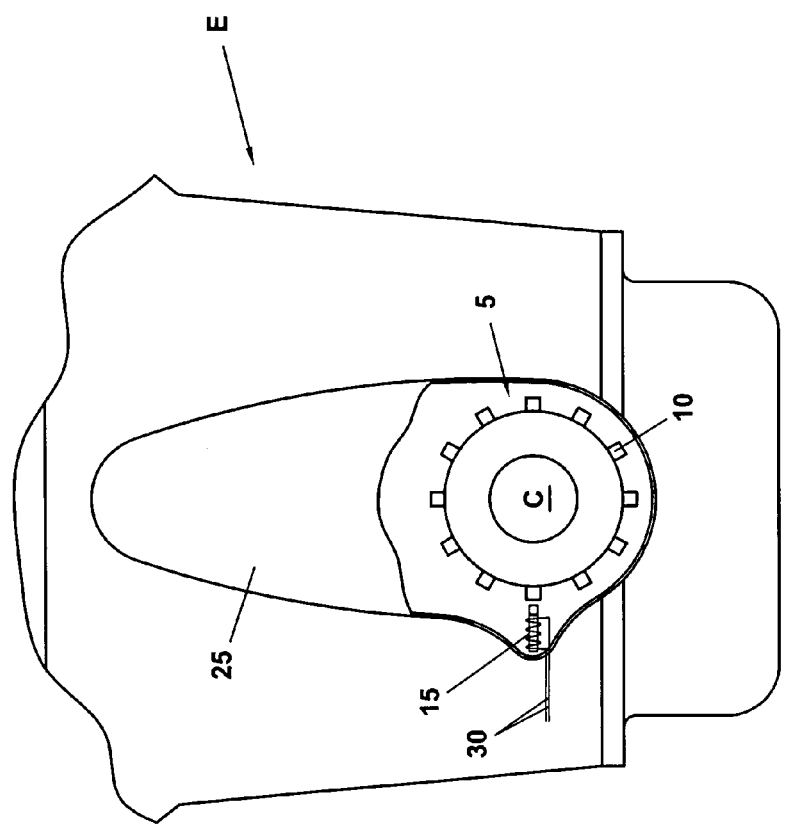
FIG. 1 depicts a typical pulse generator plate and associated sensor installed to the crankshaft of a vehicle engine, wherein various engine components have been removed for clarity.

As described above, vehicle engines may employ timing systems that make use of a pulse generator plate. FIG. 1 depicts a representative pulse generator plate 5 installed to the crankshaft C of an automobile engine E. As shown, the pulse generator plate 5 is a round plate having a central aperture adapted to receive a portion of an associated crankshaft. The particular pulse generator plate 5 shown includes a number of circumferentially spaced projections 10 that extend outward from its periphery.

Figure 2:
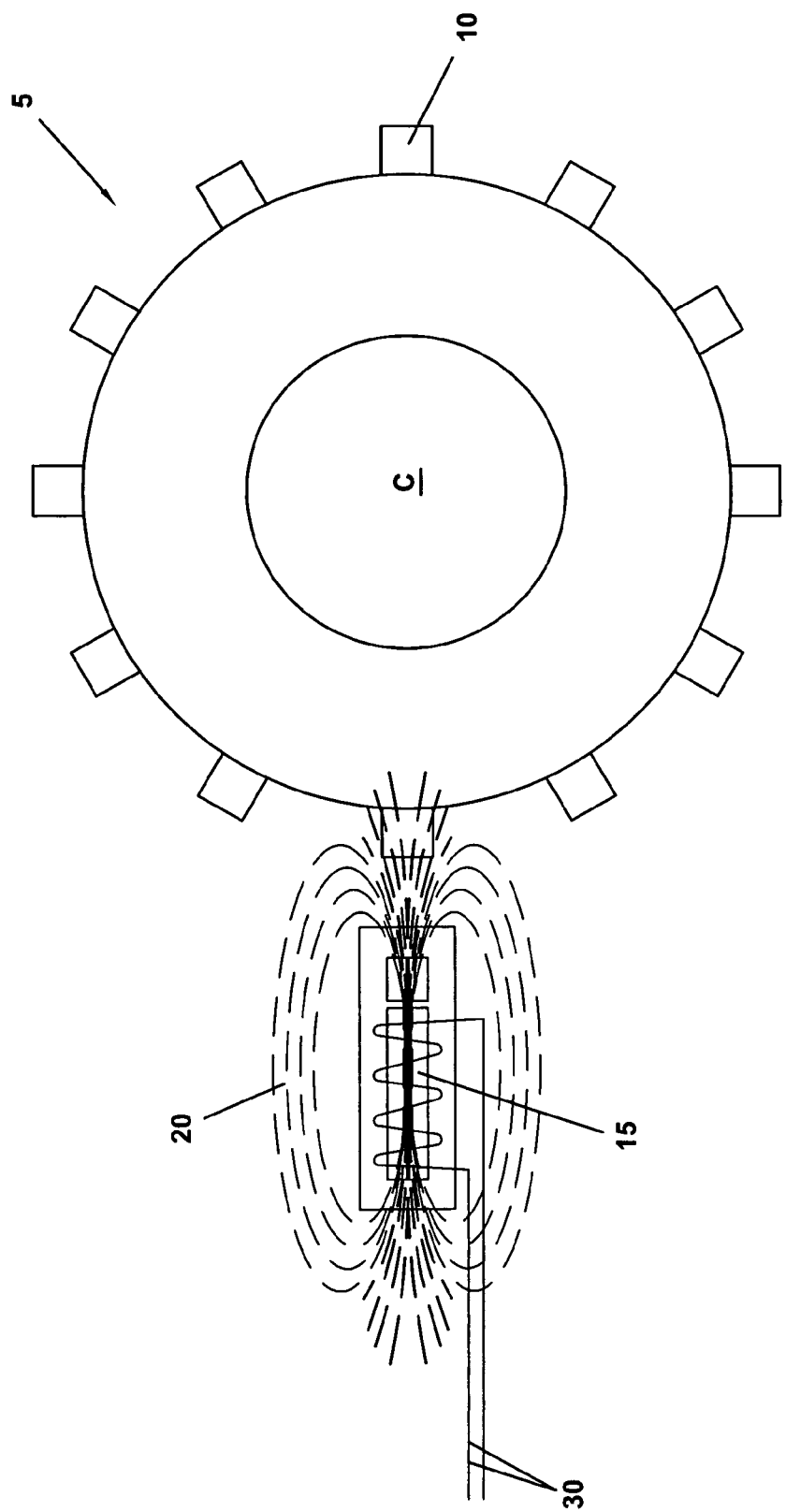
FIG. 2 illustrates how a portion of the pulse generator plate of FIG. 1 passes through a magnetic field produced by its associated sensor.

In order to assist with vehicle timing, a sensor 15 is mounted near the pulse generator plate 5. As can be best understood by reference to FIG. 2, the sensor 15 produces a magnetic field 20 that extends to at least a portion of the pulse generator plate 5. During rotation of the crankshaft C, the magnetic field 20 of the sensor 15 is interrupted each time one of the extending projections 10 of the pulse generator plate 5 passes therethrough. The interruptions in the magnetic field 20 of the sensor 15 produced by the extending projections 10 induce a current in the sensor. As would be understood by one of skill in the art, the currents induced in the sensor 15 can be used in the timing of a vehicle engine.

As can be observed in FIG. 1, both the pulse generator plate 5 and its associated sensor 15 are typically located within a sealed timing chain/belt cover 25 of the engine E. While such covers may be of various construction, the timing chain/belt cover 25 shown herein is comprised of aluminum. In any event, both the pulse generator plate 5 and the sensor 15 are hidden from view by the timing chain/belt cover 25 once the engine E has been assembled. The induced electrical currents associated with interruptions in the magnetic field 20 of the sensor 15 produced are typically transmitted from the sensor via wire leads 30 that extend through the timing chain/belt cover 25.

Figure 3:
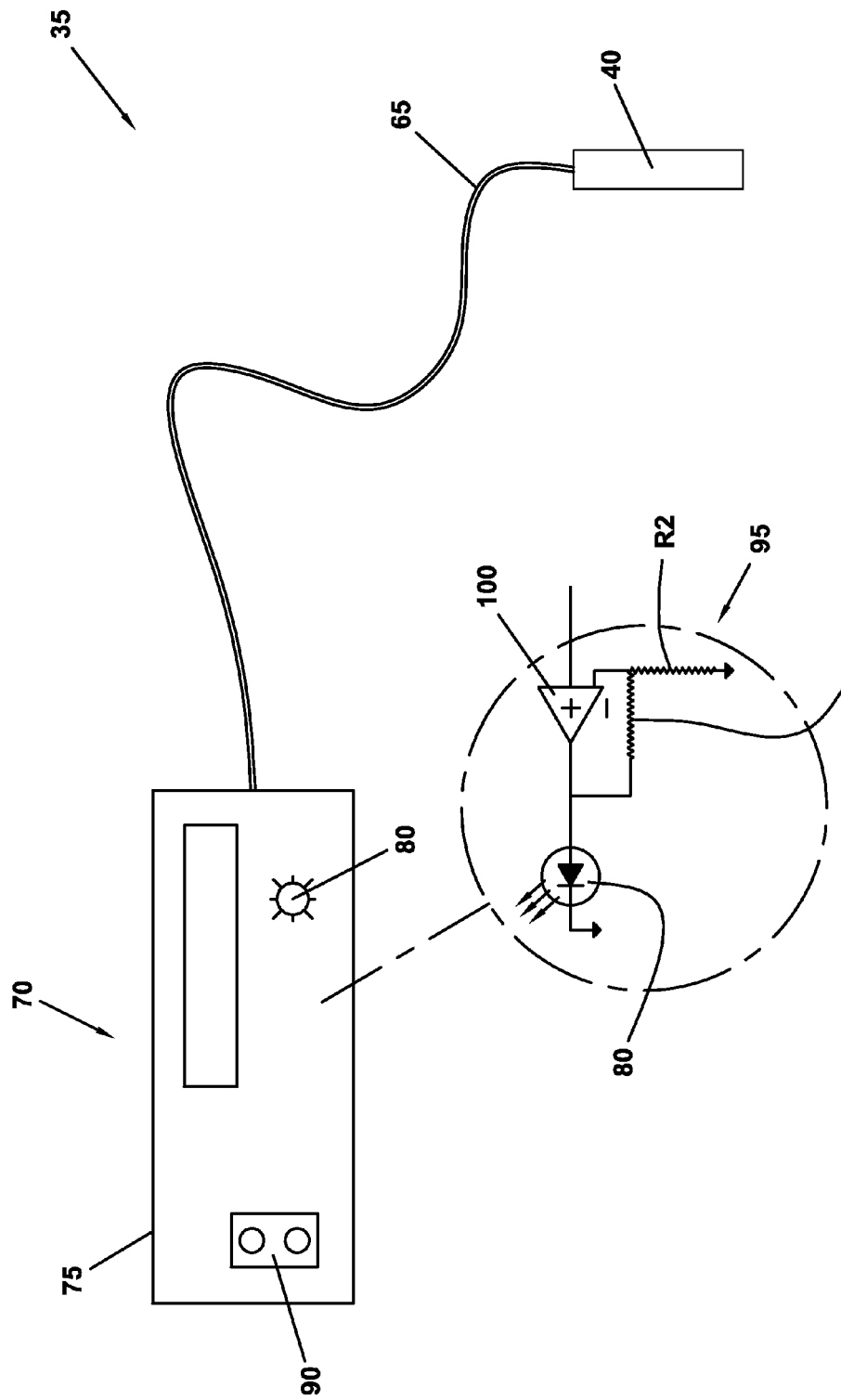
FIG. 3 represents one exemplary embodiment of a detector of the present invention.

One exemplary embodiment of a pulse generator plate detector ("detector") 35 of the present invention is depicted in basic form in FIG. 3. The detector 35 includes a detection sensor 40 in wired connection with an amplifier unit 70. As can be understood more clearly by reference to FIGS. 4-5, this particular detection sensor is comprised of a ferrous metal core 50 that resides within a coil of wire 55 having some predetermined number of turns. A ferrite rod 60 is attached to one end of the core 50 and is provided to magnetically couple the detection sensor 40 to the sensor 15 associated with the pulse generator plate 5 (as described in more detail below). Other detection sensor designs are also possible, and the present invention is not limited to the exemplary detection sensor embodiment shown and described herein.

Whatever the specific design, the detection sensor 40 nonetheless produces a magnetic field 45 in a similar manner to the pulse generator plate sensor 15. The ends of the wire coil 55 act as leads 65 for transmitting signals (current) from the detection sensor 40 to the amplifier unit (as described in more detail below).

An amplifier unit 70 of the present invention may be of a variety of designs. Preferably, the electronic components of the amplifier unit 70 are housed within some type of case 75. The amplifier unit 70 is provided to amplify the current flowing from the from the detection sensor 40. The amplified current may be used for various end purposes. For example, the amplified current may be used to energize a visual indicator, such as a LED 80, or a LCD or other type of display 90. Alternatively, the amplified current may be used to operate a relay so as to provide a contact closure type output that may be usable by other external devices. For example, one or more external devices may be connected to the amplifier unit 70 via ports 90 or other connectors provided thereon/therein.

As would be understood by one skilled in the art, the operational circuitry of the amplifier unit 70 may vary considerably in design while still performing the intended function. For purposes of illustration only, one simplistic embodiment of an acceptable amplifier circuit 95 is illustrated in the callout of FIG. 3. As shown, currents induced in the detection sensor 40 by changes in its magnetic field are transmitted via its wire leads L to an amplifier 100. The gain of the amplifier 100 is set to some predetermined value by a pair of feedback resistors R1, R2. As shown in FIG. 3, the output of the amplifier 100 is connected to the LED 80 but, as previously described, could be connected to a variety of other devices (e.g., other displays, a relay, a microprocessor, a transistor, etc.).

Figure 4:
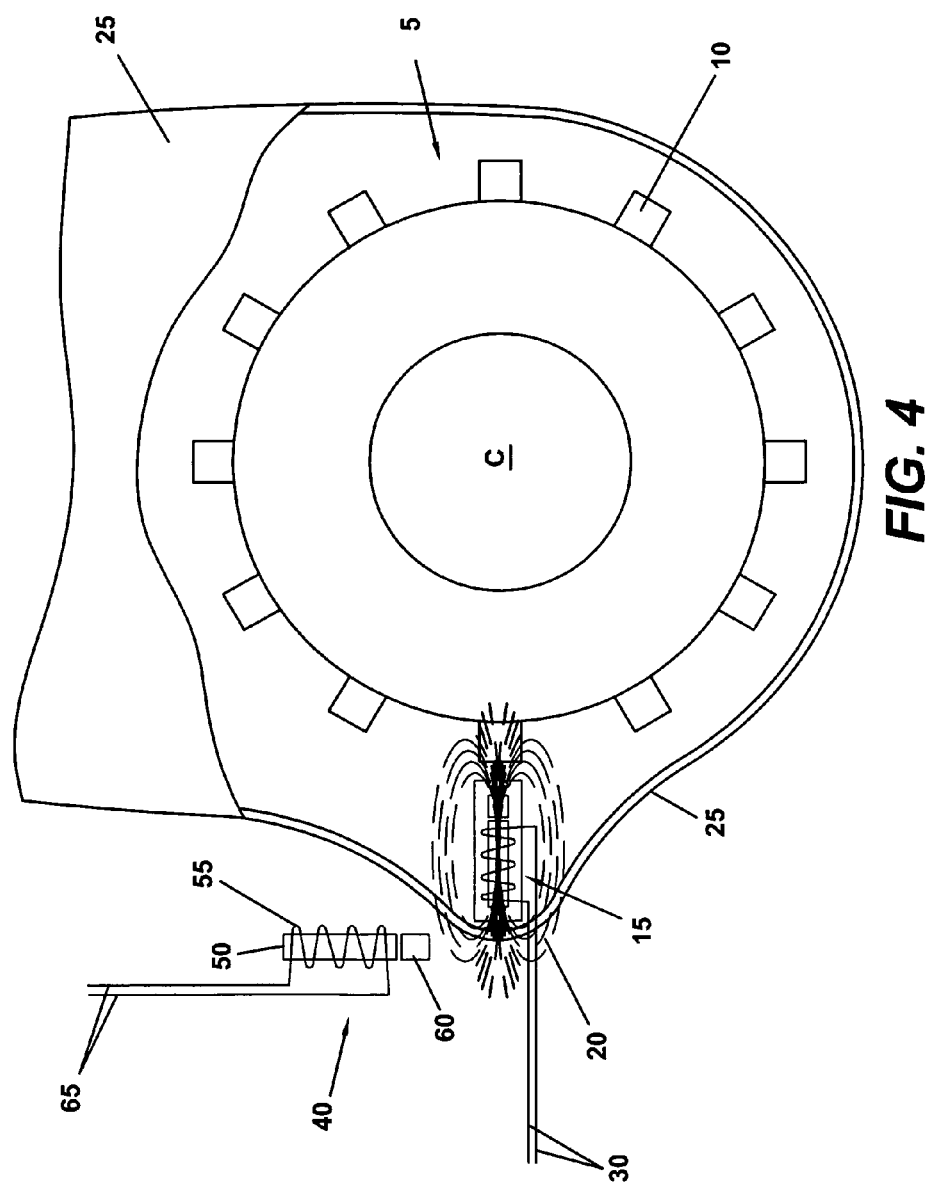
FIG. 4 shows the detection sensor portion of the detector of FIG. 3 positioned in proximity to the area of the sensor associated with the pulse generator plate.
Figure 5:
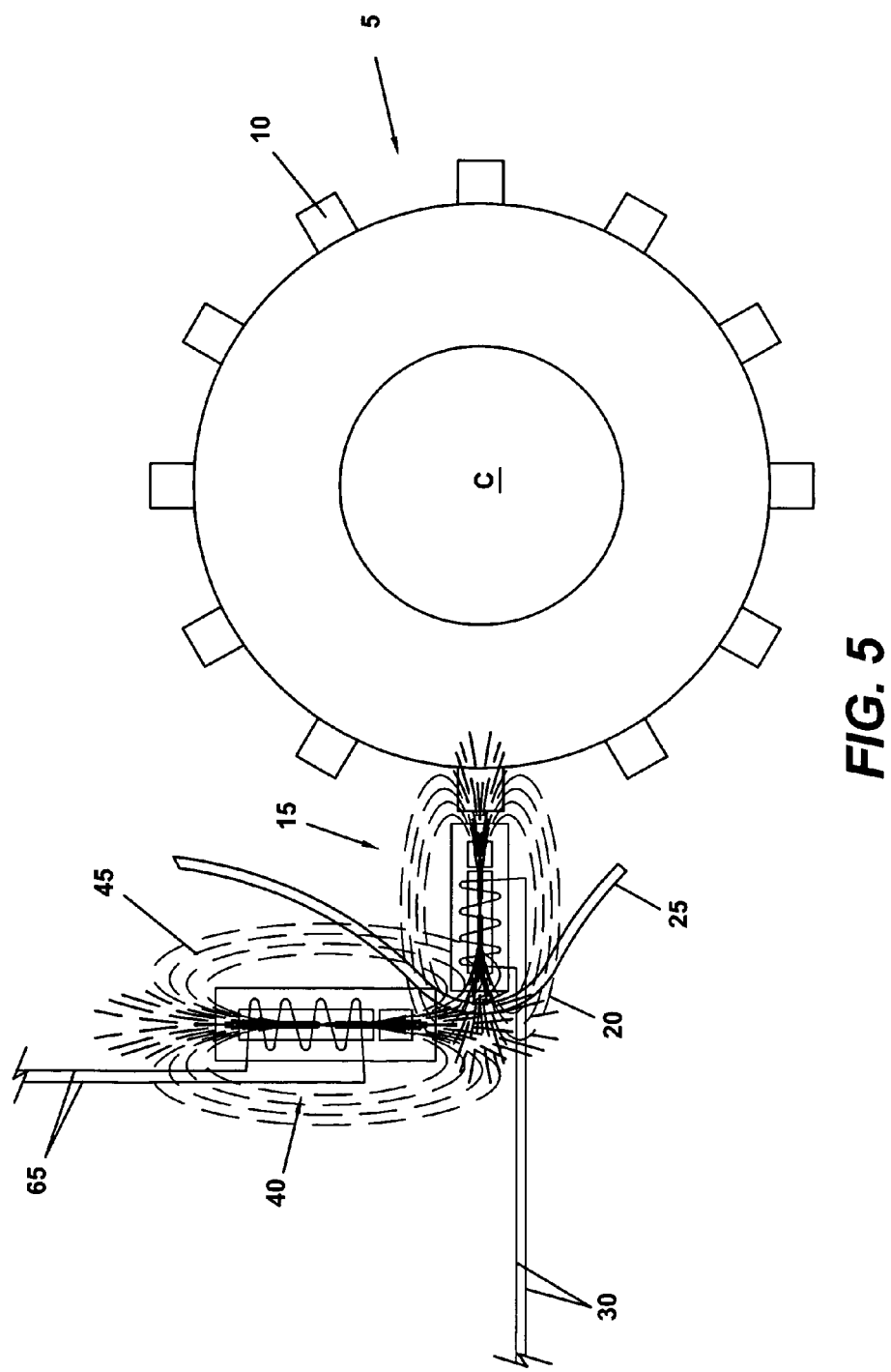
FIG. 5 illustrates how the detection sensor becomes magnetically coupled to the sensor associated with the pulse generator plate through a timing chain/belt cover of the engine.

Basic use of the detector 35 is illustrated in FIGS. 4-5. As represented in FIG. 4, the detection sensor 40 is placed near, or against, the timing chain/belt cover 25 in the area typically occupied by the pulse generator plate sensor 15 of a given engine. When a timing chain/belt cover or similar enclosure is present, a detection sensor of the present invention may be releasable affixed thereto during a detection operation. Upon subsequent rotation of the crankshaft C, the extending projections 10 of the pulse generator plate 5 cause periodic interruptions of the magnetic field 20 surrounding the pulse generator plate sensor 15. These interruptions induce currents in the pulse generator plate sensor 15, as described above.

As shown in FIG. 5, location of the detection sensor 40 in close proximity to the pulse generator plate sensor 15, causes a magnetic (inductive) coupling of the sensors through the wall of the aluminum timing chain/belt cover 25. Consequently, any interruptions in the magnetic field 20 of the pulse generator plate sensor 15 will also manifest in the magnetic field 45 of the detection sensor 40. In a manner similar to that of the pulse generator plate sensor 15, these interruptions in the magnetic field 45 of the detection sensor 40 will induce currents therein that are subsequently transmitted to the amplifier unit 70 by the detection sensor current leads 65, as has been described above.

Therefore, as can be clearly understood, a failure to induce any currents in a properly located detection sensor of the present invention during rotation of a crankshaft of interest is indicative of the absence of a pulse generator plate. The absence of a pulse detector plate may be ascertained by a user of a detector of the present invention from the non-activation of any indicators on the amplifier unit 70 and/or the non-activation of one or more devices connected to the amplifier unit.

Similarly, it can also be understood that when an undamaged pulse generator plate is present, rotation of an associated crankshaft at a substantially angular velocity should produce interruptions of the magnetic field associated with the pulse generator plate sensor at a uniform frequency. As a result, a user of a detector of the present invention may be presented with a constant frequency pulsing of an indicator light, a constant frequency graph on an associated meter (e.g. oscilloscope), etc. However, if one or more of the extending projections or other field interrupting elements is damaged or missing, the frequency of the magnetic field interruptions may vary. As such, a detection operation of the present invention may be conducted to determine the existence of damage to a pulse detector plate instead of, or in addition to, the presence of a pulse detector plate. Such damage may be observed via one or more indicators on the amplifier unit 70 and/or one or more devices connected to the amplifier unit.

Therefore, it can be seen from the foregoing description and accompanying drawing figures that a detector of the present invention can be used to detect the absence of a pulse generator plate, as well as at least certain types of damage to a pulse generator plate when such is present. Various embodiments of a detector of the present invention may be constructed for this purpose. Therefore, while certain exemplary embodiments of the present invention are described in detail above, the scope of the invention is not to be considered limited by such disclosure, and modifications are possible without departing from the spirit of the invention as evidenced by the following claims.

What is claimed is:

1. A detector for detecting a pulse generator plate on the crankshaft of an engine, comprising:
   a detection sensor; and
   an amplifier unit in wired communication with said detection sensor;
   wherein said detection sensor is designed to magnetically couple itself to a pulse generator plate sensor associated with a crankshaft of interest; and wherein any interruptions in a magnetic field produced by a pulse generator plate sensor will also manifest in a magnetic field generated by said detection sensor, said interruptions inducing currents that are subsequently transmitted to said amplifier unit and used to activate one or more indicators associated therewith.

2. The detector of claim 1, wherein said detection sensor includes a ferrous metal core that resides within a coil of wire.

3. The detector of claim 2, further comprising a ferrite rod attached to one end of the said ferrous metal core, said ferrite rod provided to facilitate coupling of said detection sensor to said pulse generator plate sensor.

4. The detector of claim 2, wherein ends of said coil of wire act as leads for transmitting said currents from said detection sensor to said amplifier unit.

5. The detector of claim 1, further comprising a visual indicator associated with said amplifier, said visual indicator provided to alert a user to the presence of a pulse generator plate.

6. The detector of claim 1, wherein said visual indicator is selected from the group consisting of a LED and a LCD.

7. The detector of claim 1, further comprising an audible indicator associated with said amplifier, said audible indicator provided to alert a user to the presence of a pulse generator plate.

8. The detector of claim 1, further comprising a relay that is operated by said amplifier unit upon receipt of a flow of current from said detection sensor, said relay operable to provide power to one or more external devices.

9. The detector of claim 8, wherein said one or more external devices are connected to a port(s) located on said amplifier unit.

10. An inductively coupleable pulse generator plate detector, comprising:
  a detection sensor having a ferrous metal core residing within a coil of wire, said detection sensor designed to produce a magnetic field; and
  an amplifier unit connected to said coil of wire; and
  at least one indicator associated with said amplifier, said indicator provided to alert a user to the presence of a pulse generator plate;
  wherein said magnetic field of said detection sensor will magnetically couple itself to a magnetic field of a pulse generator plate sensor associated with a crankshaft of interest when said detection sensor is placed in proximity to said pulse generator plate sensor; and
  wherein any interruptions in a magnetic field produced by a pulse generator plate sensor will also manifest in said magnetic field generated by said detection sensor, said interruptions inducing currents that are subsequently transmitted to said amplifier unit and used to activate said at least one indicator associated therewith.

11. The detector of claim 10, further comprising a ferrite rod attached to one end of the said ferrous metal core, said ferrite rod provided to facilitate coupling of the magnetic fields of said detection sensor and a pulse generator plate sensor.

12. The detector of claim 10, wherein said at least one indicator includes a visual indicator.

13. The detector of claim 12, wherein said visual indicator is selected from the group consisting of a LED and a LCD.

14. The detector of claim 10, wherein said at least one indicator includes an audible indicator.

15. The detector of claim 10, further comprising a relay that is operated by said amplifier unit upon receipt of a flow of current from said detection sensor, said relay operable to provide power to one or more external devices.

16. The detector of claim 15, wherein said one or more external devices are connected to a port(s) located on said amplifier unit.

17. A method for detecting a pulse generator plate located on a crankshaft of an engine, comprising:
  providing a pulse generator plate detector, said detector further comprising:
    a detection sensor having a ferrous metal core residing within a coil of wire, said detection sensor designed to produce a magnetic field,
    an amplifier unit connected to said detection sensor, and
    at least one indicator associated with said amplifier,
  placing said detection sensor of said pulse generator plate detector in proximity to the typical location of a pulse generator plate sensor for a given engine of interest, thereby causing said magnetic field of said detection sensor to magnetically couple itself to a magnetic field of said pulse generator plate sensor;
  rotating said crankshaft, whereby the presence of a pulse generator plate will produce, during crankshaft rotation, periodic current-producing interruptions in the magnetic fields produced by said pulse generator plate sensor and said detection sensor;
  transmitting current generated by such interruptions to said amplifier unit; and
  observing said at least one indicator, activation of said at least one indicator during crankshaft rotation being indicative of the presence of a pulse generator plate on said crankshaft.

18. The method of claim 17, further comprising monitoring the timing associated with any activations of said at least one indicator, inconsistencies in the timing of such activations during rotation of a crankshaft at a substantially constant angular velocity being indicative of damage to an associated pulse generator plate of interest.

19. The method of claim 17, wherein said detection sensor of said pulse generator plate detector is temporarily affixed during a detection operation to a wall of a housing that encloses a pulse generator plate sensor and any associated pulse generator plate present on a crankshaft of interest.

20. The method of claim 18, further comprising connecting one or more external devices to said amplifier unit, said external devices used to indicate the presence of and/or damage to a pulse generator plate during a detection process.

* * * * *

UNITED STATES PATENT AND TRADEMARK OFFICE
CERTIFICATE OF CORRECTION

| | | |
|---|---|---|
| PATENT NO. | : 7,775,090 B1 | Page 1 of 1 |
| APPLICATION NO. | : 12/057286 | |
| DATED | : August 17, 2010 | |
| INVENTOR(S) | : Rankin | |

It is certified that error appears in the above-identified patent and that said Letters Patent is hereby corrected as shown below:

In the Claims:

In column 5, line 20, claim 6 please delete "6. The detector of claim 1" and insert
-- 6. The detector of claim 5 --.

Signed and Sealed this

Twenty-first Day of September, 2010

David J. Kappos
*Director of the United States Patent and Trademark Office*